No. 834,481. PATENTED OCT. 30, 1906.
C. C. M. MORTENSEN.
WORK HOLDER FOR MACHINE TOOLS.
APPLICATION FILED APR. 11, 1904.
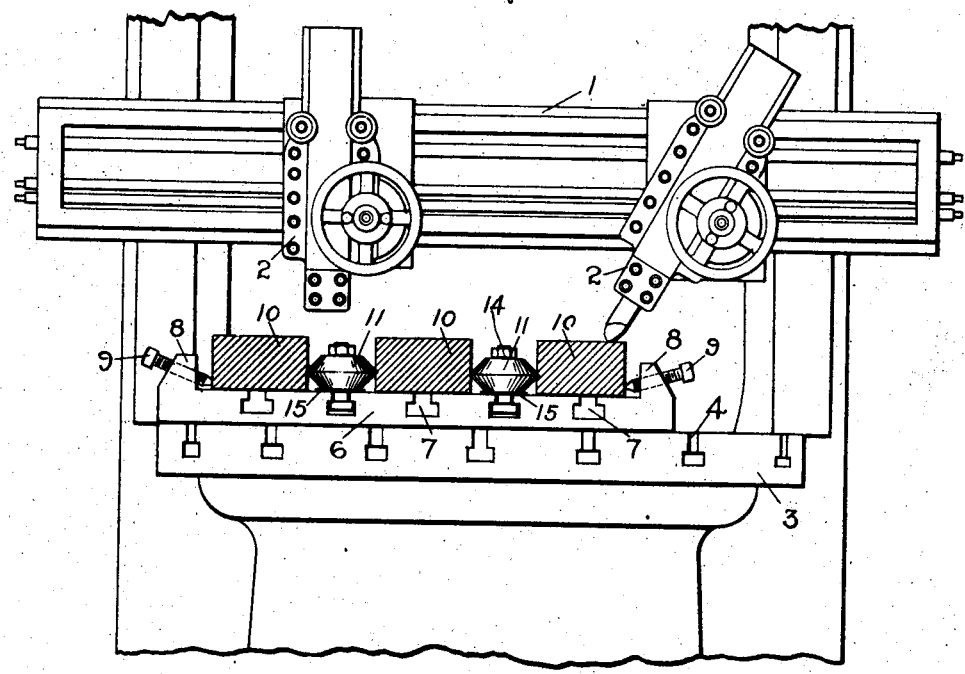
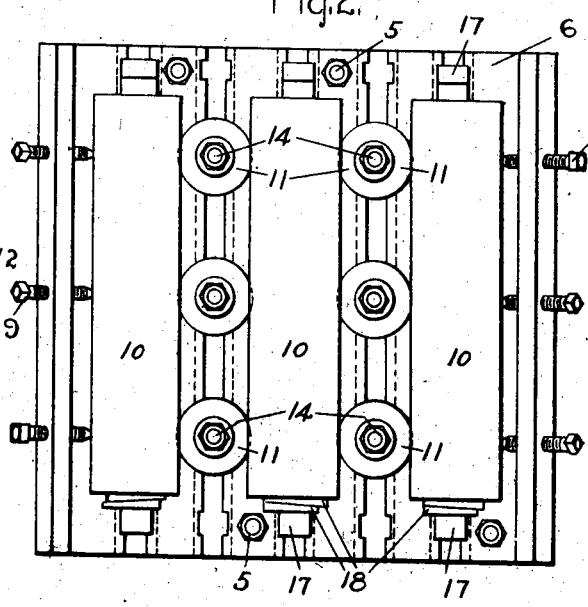
WITNESSES:
INVENTOR
Casper C. M. Mortensen,
by
Atty.

UNITED STATES PATENT OFFICE.

CASPER C. M. MORTENSEN, OF SCHENECTADY, NEW YORK, ASSIGNOR TO GENERAL ELECTRIC COMPANY, A CORPORATION OF NEW YORK.

WORK-HOLDER FOR MACHINE-TOOLS.

No. 834,481.     Specification of Letters Patent.     Patented Oct. 30, 1906.

Application filed April 11, 1904. Serial No. 202,633.

To all whom it may concern:

Be it known that I, CASPER C. M. MORTENSEN, a citizen of the United States, residing at Schenectady, county of Schenectady, State of New York, have invented certain new and useful Improvements in Work-Holders for Machine-Tools, of which the following is a specification.

The present invention relates to clamping devices for securing blocks or other pieces of work to the platen or other support of a machine-tool, and has for its object the provision of a device of this character which shall be capable of adjustment to clamp the work with greater or less force upon the platen or support of the machine-tool, readily adaptable for use in connection with a large variety of work, and of simpler and less expensive construction than the devices heretofore in use for accomplishing the same function.

For a more complete understanding of my invention reference may be made to the following detailed specification and the accompanying drawings, forming a part thereof, in which—

Figure 1 is a front side elevation of a boring-mill having attached thereto a work-holder embodying my invention. Fig. 2 is a top plan of the work-holder. Fig. 3 is a side elevation of a clamping-disk, and Fig. 4 is a vertical section of a modified form of clamping-disk.

The boring-mill is provided, as usual, with a cross-bar 1, upon which are carried two tool-posts 2, and beneath the cross-bar and tool-posts is arranged a revoluble platen or table 3, having radial grooves 4 in its upper surface for the reception of the strap-bolts ordinarily employed in securing the work in place thereon. Upon the platen or table 3 I secure by bolts 5 a heavy form 6, having longitudinal bolt-grooves 7 and side shoulders or projections 8, through which are screwed set-bolts 9 at an acute angle to the surface of the form, so that their points will move downwardly toward the surface as they are screwed inwardly, thereby effecting a clamping action of the pieces of work 10 upon the surface of the form.

The pieces of work 10 are shown as straight bars of iron of rectangular cross-section; but my clamping device is designed for use in connection with curved and irregularly-shaped pieces as well. Between the adjacent edges of the pieces of work I place clamping disks or members 11, having peripheral knife-edges 12, made by turning off the opposite corners to form frusto-conical surfaces with their larger ends joined, and provided with axial apertures 13, through which pass the bolts 14, by which they are clamped to the form. By screwing the bolts 9 upon the outer edges of the pieces of work 10 their points become embedded therein and operate to force them into engagement with the surface of the form 6, and at the same time the several pieces of work are crowded together, causing the knife-edges 12 of the clamping-disks 11 to embed themselves in the adjacent sides of the work-pieces. Then by tightening up the bolts 14 the disks 11 and the intermediate pieces of work 10 are positively forced into engagement with the surface of the form.

In order that the clamping-disks 11 may be yieldingly supported away from the surface of the form, I provide flexible washers 15, of rubber or other suitable material, which readily yield when the bolts 14 are tensioned.

In certain cases where the thickness of the metal pieces worked upon is slight or such that the tool would ordinarily engage the upper ends of the bolts 14 clamping-disks having countersinks 16 in their upper ends, as shown in Fig. 4, may be used. The pieces of work 10 are held from longitudinal movement by blocks 17 and keys 18.

It is apparent that the form 6 might be omitted and the several clamping members secured direct to the table or platen of the machine-tool, particularly when the work done was light and the table or platen provided with a sufficient number of bolt-grooves 4 to permit the clamping-bolts 14 to be disposed advantageously.

I do not desire to restrict myself to the particular form or construction of parts herein described and shown, for it is apparent that they may be changed and modified without departing from my invention.

What I claim as new, and desire to secure by Letters Patent of the United States, is—

1. In a multiple work-holder for machine-tools, the combination of a clamping member provided with knife-edges on opposite sides, means for forcing the work into engagement with both of said knife-edges, and means for forcing said clamping member toward the surface of the machine-tool.

2. In a multiple work-holder for machine-tools, the combination of a plurality of clamping members each provided on opposite sides with knife-edges, means for forcing the work into engagement with said knife-edges, and means for forcing said clamping members toward the surface of the machine-tool.

3. In a multiple work-holder for machine-tools, the combination of a clamping member provided with a peripheral knife-edge, means for forcing the work into engagement with said knife-edge, yieldable means for supporting said clamping member in elevated position, and means for thereafter forcing said clamping member toward the surface of the machine-tool.

4. In a multiple work-holder for machine-tools, the combination of a clamping member provided with a peripheral knife-edge and a countersunk recess, means for forcing the work into engagement with said knife-edge, and a bolt secured to the surface of the machine-tool extending through said clamping member and provided with a nut located within the countersunk recess.

5. In a multiple work-holder for machine-tools, the combination of a form having shoulders or projections on opposite sides, bolts threaded in said shoulders or projections at an angle to the surface of said form, and clamping members having knife-edges on their opposite sides and secured to said form between said shoulders or projections.

6. In a work-holder for machine-tools, the combination of a form having shoulders or projections on opposite edges, bolts threaded in said shoulders or projections at acute angles to the surface of said form, clamping-disks located between said shoulders or projections, and means for forcing said disks toward the surface of said form after the work has been forced into engagement therewith by means of the said bolts.

In witness whereof I have hereunto set my hand this 8th day of April, 1904.

CASPER C. M. MORTENSEN.

Witnesses:
   BENJAMIN B. HULL,
   HELEN ORFORD.